United States Patent [19]
Stoll et al.

[11] Patent Number: 5,132,835
[45] Date of Patent: Jul. 21, 1992

[54] CONTINUOUS-TIME OPTICAL NEURAL NETWORK PROCESS

[75] Inventors: Harold M. Stoll, Palos Verdes; Li-Shing Lee, Los Angeles, both of Calif.

[73] Assignee: Northrop Corporation, Los Angeles, Calif.

[21] Appl. No.: 562,175

[22] Filed: Aug. 3, 1990

Related U.S. Application Data

[62] Division of Ser. No. 220,769, Jul. 18, 1988, abandoned.

[51] Int. Cl.$^5$ .............................. G02F 3/00; H01S 3/00
[52] U.S. Cl. ..................... 359/339; 359/346; 395/25; 395/100; 369/103; 369/109
[58] Field of Search .................. 330/4.3; 356/347; 350/347; 364/822, 513; 359/339, 346; 395/25; 369/103, 109; 365/49, 125

[56] References Cited

U.S. PATENT DOCUMENTS

| | | | |
|---|---|---|---|
| 4,739,496 | 4/1988 | Moran et al. | 356/347 |
| 4,750,153 | 6/1988 | Owechko et al. | 356/347 |
| 4,762,397 | 8/1988 | Pepper | 350/347 V |

FOREIGN PATENT DOCUMENTS 2126037 3/1984 United Kingdom.

OTHER PUBLICATIONS

L. D. Jackel, H. P. Graf, and R. E. Howard, "Electronic neural network chips," Applied Optics, vol. 26, p. 5077 (1987).
A. P. Thakoor, A. Moopenn, J. Lambe and S. K. Khanna, "Electronic hardware implementation of neural networks," Applied Optics, vol. 26, p. 5085 (1987).
N. H. Farhat, "Opto-electronic analogs of self-programming neural nets: architectures and methodologies for implementating fast stochastic learning by simulated annealing," Applied Optics, vol. 26, p. 5093 (1987).
Y. Owechko, "Opto-electronic resonator neural networks," Applied Optics, vol. 26, p. 5104 (1987).
A. D. Fisher, W. L. Lippincott, and J. N. Lee, "Optical implementations of associative networks with versatile adaptive learning capabilities," Applied Optics, vol. 26, p. 5039 (1987).
D. Psaltis, "Optical realizations of neural network models," Proceedings of the International Society for Optical Engineering, vol. 700, p, 278 (1986).
E. G. Paek and D. Psaltis, "Optical assiciative memory using Fourier transform holograms," Optical Engineering, vol. 26, p. 428 (1987).
D. Psaltis and N. Farhat, "Optical information processing based on an associative-memory model of neural nets with thresholding and feedback," Optic Letters, vol. 10, p. 98 (1985).
D. Z. Anderson, *Neural Networks for Computing*, American Institute of Physics Conference Proceedings 151, New York (1986).
D. Z. Anderson and M. C. Erie, "Resonator memories and optical novelty filters," Optical Engineering, vol. 26, p. 434 (1987).
M. Cohen, "Design of a new medium for volume holographic information processing," Applied Optics, vol. 25, p. 2288 (1986).
B. H. Soffer, G. J. Dunning, Y. Owechko, and E. Marom, "Associative holographic memory with feedback using phase-conjugate mirrors," Optics Letters, vol. 11, p. 118 (1986).

(List continued on next page.)

*Primary Examiner*—Nelson Moskowitz
*Attorney, Agent, or Firm*—Terry J. Anderson; Robert B. Block

[57] ABSTRACT

An all-optical, continuous-time, recurrent neural network is disclosed which is capable of executing a broad class of energy-minimizing neural net algorithms. The network is a resonator which contains a saturable, two-beam amplifier; two volume holograms; and a linear, two-beam amplifier. The saturable amplifier permits, through the use of a spatially patterned signal beam, the realization of a two-dimensional optical neuron array; the two volume holograms provide adaptive, global network interconnectivity; and the linear amplifier supplies sufficient resonator gain to permit convergent operation of the network.

8 Claims, 4 Drawing Sheets

OTHER PUBLICATIONS

A. Yariv and S-K. Kwong, "Associate memories based on message-bearing optical modes in phase-conjugate resonators," Optic Letters, vol. 11, p. 186 (1986).

A. Yariv, S-K. Kwong, and K. Kyuma, "Demonstration of an all-optical associative holographic memory," Applied Physics Letters, vol. 48, p. 1114 (1986).

Y. Fainman, E. Klancnik, and S. H. Lee, "Optimal coherent image amplification by two-wave coupling in photorefractive $BaTiO_3$," Optical Engineering, vol. 25, p. 228 (1986).

N. H. Farhat and D. Psaltis, "Optical information processing based on an associative-memory model of neural nets with thresholding and feedback," Optics Letters, vol. 10, p. 98 (198).

D. O. Hebb, *The Organization of Behavior*, Wiley, N.Y., 1949.

A. B. Vander Lugt, "Signal detection by complex spatial filtering," IEEE Transactions on Information Theory, vol. IT-20, p. 2 (1964).

C. N. Kurtz, "The transmittance characteristics of surface diffusers and the design of nearly band-limited binary diffusers," Journal of the Optical Society of America, vol. 62, p. 982 (1972).

T. Jannson, H. M. Stoll, and C. Karagulett, "The interconnectability of neuro-optic processors," Proceeding of the International Society for Optical Engineering, vol. 698, p. 157 (1986).

K. Wagner and D. Psaltis, "Multilayer optical learning networks," Applied Optics, vol. 26, p. 5061 (1987).

C. C. Guest and R. TeKolste, "Designs and devices for optical bidirectional associative memories," Applied Optics, vol. 26, p. 5055 (1987).

D. L. Staebler, W. J. Burke, W. Phillips, and J. J. Amodei, "Multiple storage and exposure of fixed holograms in Fe-doped $LiNbO_3$," Applied Physics Letters, vol. 26, p. 182 (1975).

M. Born and E. Wolf, *Principle of Optics*, Pergamon Press (1965).

J. A. Anderson, J. W. Silverstein, S. A. Ritz, and R. S. Jones, "Distinctive features, categorical perception, and probability learning: some applications of a neural model," Psychological Review, vol. 84, p. 413 (1977).

J. J. Hopfield, "Neural Networks and physical systems with emergent collective computational abilities," Proceedings of the National Academy of Sciences, USA, vol. 79, p. 2554 (1982)..

T. Kohonen and E. Oja, *Parallel Models of Associative Memory*, Chapter 4, Lawrence Erlbaum Associates, New Jersey (1981).

Owechko et al., "Holographic Associative . . . Domain"; Appl. Opt., vol. 26, #10, May 15, 1987; pp. 1900-1910.

Anderson et al.; "Resonator/Memories . . . Filters"; Opt. Eng., vol. 26, #5, May 1987, pp. 434-444.

Jannson et al.; "The Interconnectability . . . Processors"; Aug. 1986, vol. 698, pp. 157-169; RTSP Conf. in San Diego, Calif. abst.

Karaguleff et al.; "Analysis of . . . Photorefractive Crystal"; Jan. 1986, vol. 613, pp. 268-274; NOA Conf. LA, Calif. abst.

Anderson et al.; "Dynamics Optical . . . Operators"; Appl. Opt., vol. 26, #23, pp. 5031-5038, Dec. 1, 1987; abst.

Wagner et al.; "Multilayer Optical Learning Network"; vol. 752, pp. 86-97, Proc. SPIE, LA, Calif.; abst.

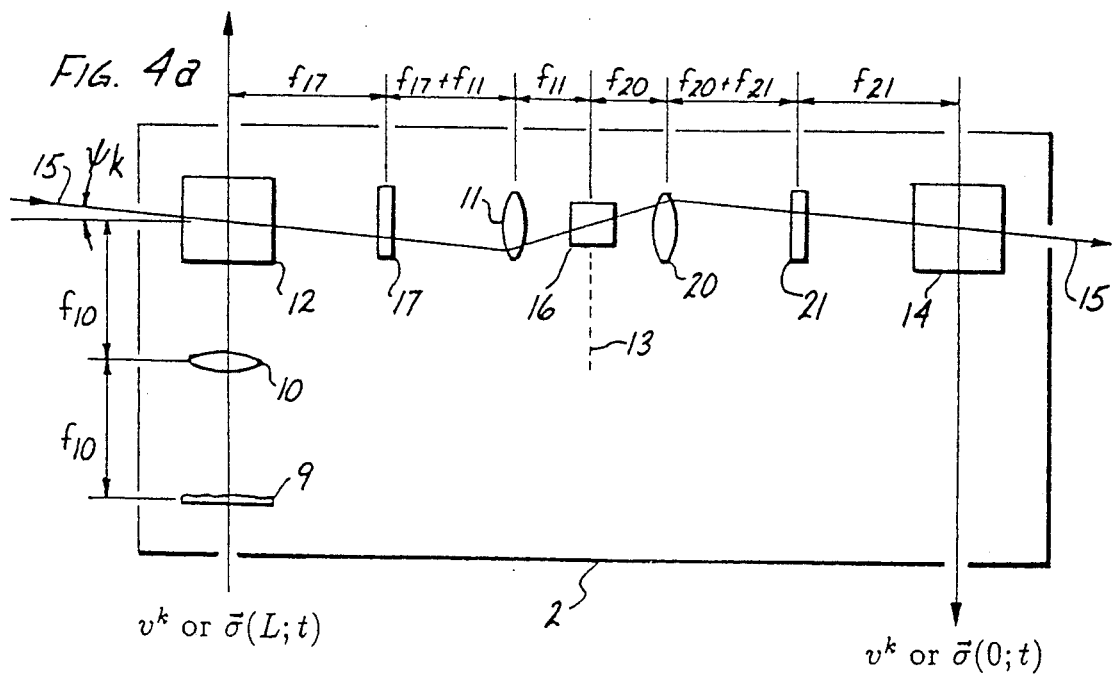
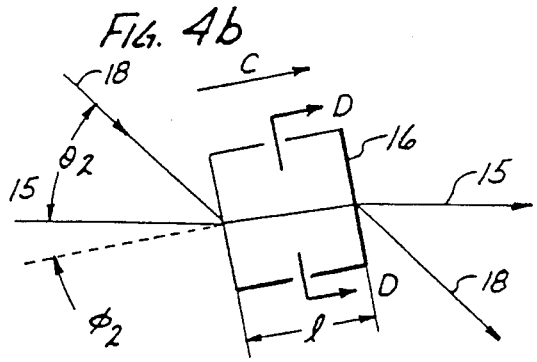
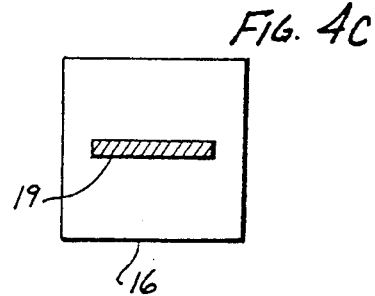
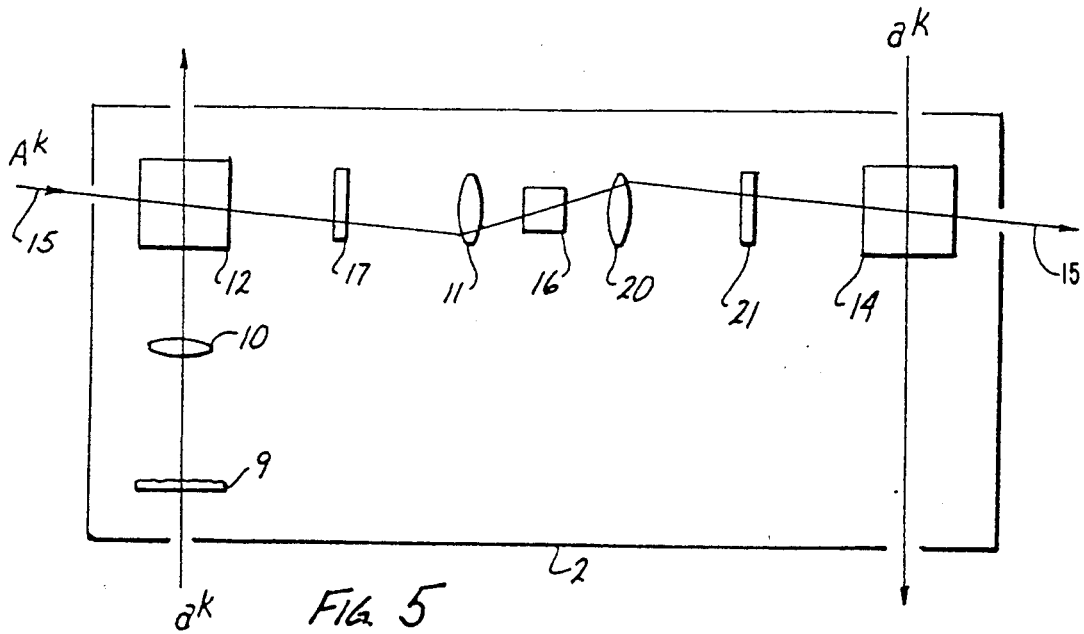

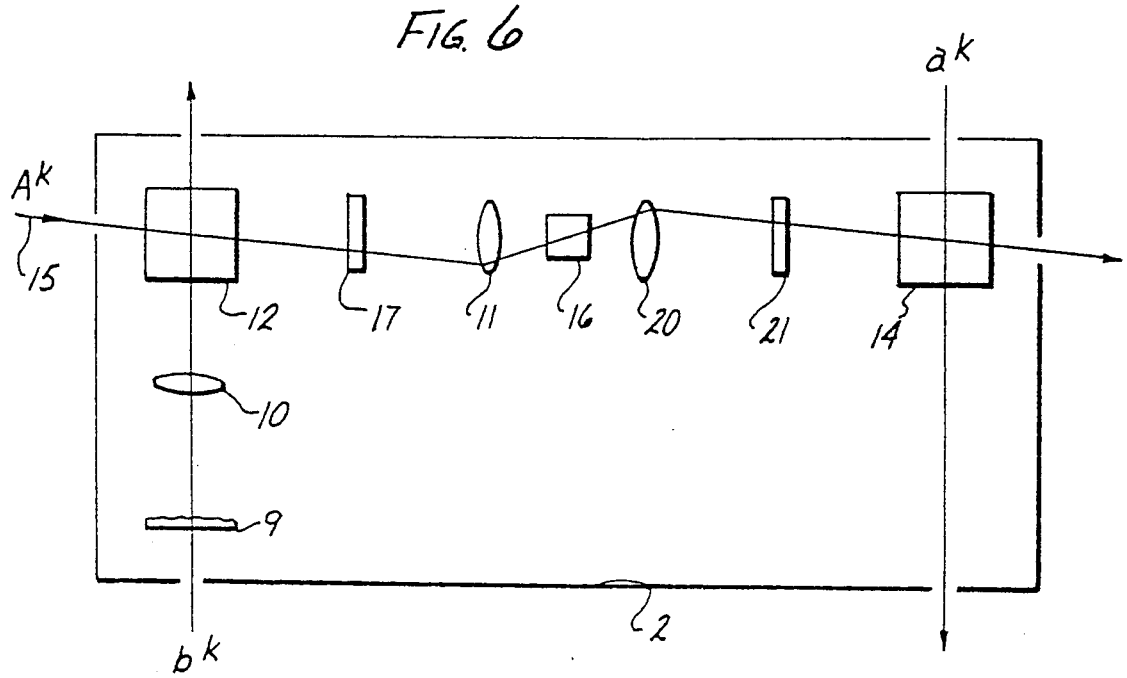
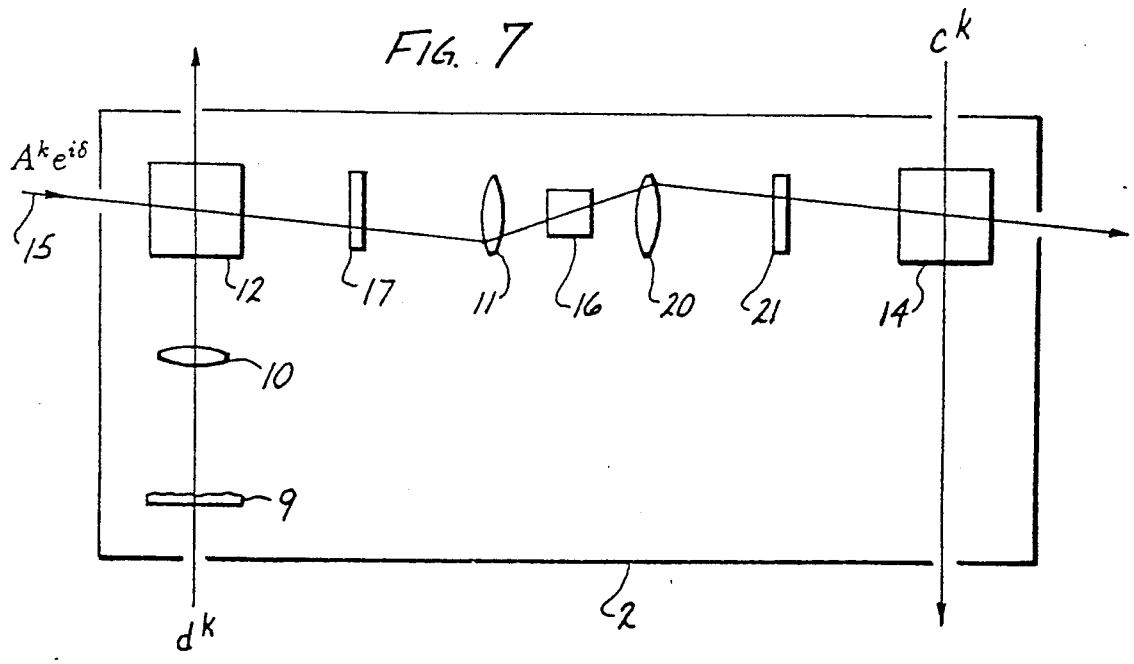

CONTINUOUS-TIME OPTICAL NEURAL NETWORK PROCESS

CONTRACTUAL ORIGIN OF THE INVENTION

The U.S. Government has rights in this invention pursuant to Contract No. P.O. BX-1324#5170-00-215 between the U.S. Air Force and Northrop Corporation.

CROSS-REFERENCE TO RELATED APPLICATION

Cross reference is made to our pending application Ser. No. 07/220,769, filed Jul. 18, 1988, entitled Continuous-Time Optical Neural Network and Process, of which this application is a division, and which is now abandoned.

BACKGROUND OF THE INVENTION

An all-optical continuous-time, recurrent neural network is disclosed which is capable of executing a broad class of energy-minimizing neural net algorithms.

The real-time (one millisecond) solution of certain high-dimensionality information processing problems (involving between $10^4$ and $10^6$ parallel input channels of information) would require Von Neumann (serial) computers with throughputs of between $10^{12}$ and $10^{15}$ arithmetic operations per second. Because no such Von Neumann computers are currently available, neural networks have been proposed to solve these problems. High-dimensionality problems such as image understanding (involving feature extraction), multispectral sensor fusion (involving associative recall), and path planning (involving constrained problem optimization) are, therefore, candidates for solutions using neural networks.

The architectures of neural networks are based on greatly simplified models of the brain and consist of a large number of highly interconnected, nonlinear processing elements or "neurons". Network inputs are typically noisy, incomplete, or distorted patterns of information; and, network outputs are decisions which consist of noise-free completed patterns, pattern features, inferred associations, or very-good-to-best solutions to constrained optimization (cost minimization) problems.

A number of electronic, opto-electronic, and optical neural networks based on the above architectural and functional paradigms have been described in the literature. Electronic neural networks consist of "electronic" neurons and electrical interconnections fabricated on a planar substrate (e.g., silicon). Electronic neural networks are typically fast (a decision can be made in times on the order of a microsecond or less depending on the size of the network) but, because of their planar geometries, can only accommodate a limited number ($\leq 10^3$) of adaptively and globally interconnected neurons. Examples of electronic neural networks include those described by L. D. Jackel, H. P. Graf, and R. E. Howard in "Electronic neural network chips," Applied Optics, vol. 26, p. 5077 (1987) and by A. P. Thakoor, A. Moopenn, J. Lambe and S. K. Khanna in "Electronic hardware implementation of neural networks," Applied Optics, vol. 26, p. 5085 (1987).

Opto-electronic neural networks incorporate opto-electronic neurons (photodetectors, electronic processing chips, and light-emitting diodes) and free-space optical interconnections. While these networks are, in principle, capable of supporting as many as $10^3$ adaptively and globally interconnected neurons, they are complex, slow and energy inefficient. Examples of opto-electronic neural networks include those described by N. H. Farhat in "Opto-electronic analogs of self-programming neural nets: architectures and methodologies for implementing fast stochastic learning by simulated annealing," Applied Optics, vol. 26, p. 5093 (1987); by Y. Owechko in "Opto-electronic resonator neural networks," Applied Optics, vol. 26, p 5104 (1987); and by A. D. Fisher, W. L. Lippincott, and J. N. Lee in "Optical implementations of associative networks with versatile adaptive learning capabilities," Applied Optics, vol. 26, p. 5039 (1987).

Optical neural networks incorporate "optical" neurons and three-dimensional optical interconnections. These networks seek to minimize architectural complexity while, at the same time, maximizing device throughput, adaptivity, and efficiency. Examples of optical neural networks include non-resonant architectures described by D. Psaltis in "Optical realizations of neural network models," Proceedings of the International Society for Optical Engineering, vol. 700, p. 278 (1986); by E. G. Paek and D. Psaltis in "Optical associative memory using Fourier transform holograms," Optical Engineering, vol. 26, p. 428 (1987); and by D. Psaltis and N. Farhat in "Optical information processing based on an associative-memory model of neural nets with thresholding and feedback," Optics Letters, vol. 10, p. 98 (1985). Network-like optical architectures capable of storing and associatively recalling orthogonal memories (optical resonator eigenmodes) have also been described by D. Z. Anderson in *Neural Networks for Computing*, American Institute of Physics Conference Proceedings 151, New York (1986); by D. Z. Anderson and M. C. Erie in "Resonator memories and optical novelty filters," Optical Engineering, vol. 26, p. 434 (1987); and by M. Cohen in "Design of a new medium for volume holographic information processing," Applied Optics, vol. 25, p. 2288 (1986). Finally, non-resonant, network-like architectures capable of content-addressable associative recall have been described by B. H. Soffer, G. J. Dunning, Y. Owechko, and E. Marom in "Associative holographic memory with feedback using phase-conjugate mirrors," Optics Letters, vol. 11, p. 118 (1986); by A. Yariv and S-K. Kwong in "Associative memories based on message-bearing optical modes in phase-conjugate resonators," Optics Letters, vol. 11, p. 186 (1986); and by A. Yariv. S-K. Kwong, and K. Kyuma in "Demonstration of an all-optical associative holographic memory," Applied Physics Letters, vol. 48, p. 1114 (1986).

BRIEF SUMMARY OF THE INVENTION

In view of the need for highly parallel and/or high-throughput computing architectures, it is a broad object of this invention to provide new and improved optical neural networks. It is a further object to provide optical neural networks which are resonant, adaptive and can execute a variety of energy-minimizing neural net algorithms.

These and other objects, as will become evident from the remainder of this specification, are achieved by a novel optical neural network, including a two-beam saturable amplifier, a global interconnect including first and second volume holograms and a linear amplifier connected in series as a resonator. The saturable amplifier, in response to a spatially patterned input signal beam, forms a two-dimensional optical neuron array and serves as a two-beam amplifier. The first and second volume holograms form the adaptive global network interconnects and the linear amplifier supplies sufficient resonator gain for convergent operation of the network. The global interconnect updates the neural state vector output from the saturable amplifier by multiplying the state vector output by the interconnect matrix generated as a result of the exposure of the interconnect to a training set.

Preferably, the first hologram comprises a Fourier-space hologram to compute inner product terms and the second hologram comprises an object-space hologram to perform a summation. The linear amplifier and the saturable amplifier can each comprise a volume photorefractive optical amplifier. Barium titanate photorefractive crystals are presently preferred for the linear amplifier and the saturable amplifier; and lithium niobate photorefractive crystals are presently preferred for the first and second holograms. The network is preferably augmented by including a phase encoder operatively associated with the first hologram.

The objects of the invention are further achieved in an optical neural network of the invention formed from a plurality of photorefractive crystals which are located in a resonator. A portion of these photorefractive crystals is chosen to serve as optical neural interconnects for optically connecting a plurality of optical neurons. A further portion of the photorefractive crystals introduces gain into the resonator. The gain means can include means for supplying a coherent pump beam to a respective photorefractive crystal. In the case of the linear amplifier, the pump beam is preferably shaped as a ribbon-shaped beam.

An optical neural network of the invention can further include a saturable amplification means for supplying neural gain and a linear amplification means for providing network resonance.

The interconnect means can include a Fourier-space hologram and an object-space hologram for holographically interconnecting the optical neurons and further can include a common reference beam for both the Fourier-space and object-space holograms.

For optimization of the optical neural network of the invention, a coherent pump beam, utilized for gain in the saturable amplifier, is chosen to intersect only one neural volume in the saturable amplifier.

Additionally, the objects of the invention can be achieved by an optical neural network of the invention formed as an optical resonator having an array of optical neurons in the resonator and an optical interconnect means in the resonator for recurrently optically interconnecting the optical neurons. The resonator further includes a means for achieving convergent resonance in the network.

In an advantageous process of the invention for convergence on an attractor of the optical neural network, a saturable amplifier, first and second volume holograms, and a linear amplifier are located in a resonator. The network is adaptively trained by inputting training sets into the network in conjunction with illumination of the first and second holograms with a coherent reference beam. The saturable amplifier and the linear amplifier are operated with coherent pump beams in conjunction with input of a training pattern into the network. This process can be augmented by locating a phase encoder in the network in association with the holograms and further by shaping the pump beam of the linear amplifier as a ribbon-shaped beam.

In a further advantageous process of the invention for convergence on a global minimum attractor of a neural network, a plurality of neurons is located in a network with means for interconnecting the neurons. The output of each neuron has a real and an imaginary part. A stimulus pattern having a complex stimulus field is inputted into the network. The complex stimulus field includes both a real part and an imaginary part. The network is operated for a time sufficient for the network to converge on the global minimum network attractor.

BRIEF DESCRIPTION OF THE DRAWINGS

FIG. 4 is a detailed diagram of the optical interconnect matrix (in the diagram, $f_L$ is the focal length of lens L); wherein FIG. 4a is a plan view of matrix; FIG. 4b is a cross sectional view through the linear, two-beam amplifier normal to the plane of the network; FIG. 4c is a cross sectional view taken along the line D—D of FIG. 4b;

FIG. 5 is a diagram illustrating the generation of a symmetric optical interconnect matrix;

FIG. 6 is a diagram illustrating the generation of an asymmetric optical interconnect matrix;

FIG. 7 is a diagram illustrating the generation of a complex, asymmetric optical interconnect matrix;

FIG. 8 is a diagram illustrating the generation of an optical interconnect matrix in which sub-regions of the matrix have elements equal to zero; wherein

DESCRIPTION OF THE PREFERRED EMBODIMENT

Figure 1:
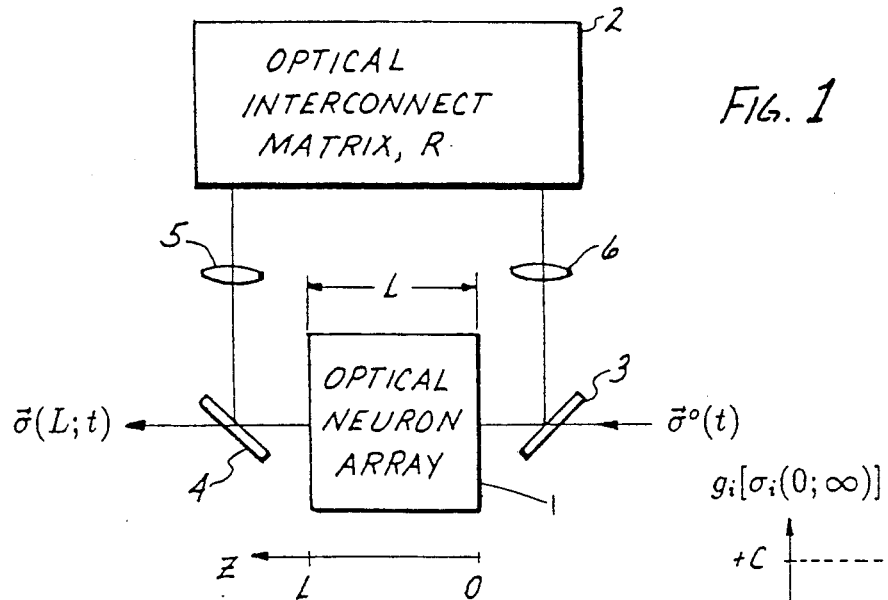
FIG. 1 is a schematic diagram of the invention.

A schematic diagram of the network is shown in FIG. 1. It consists of an array 1 of "optical neurons" which have been recurrently interconnected via a holographically generated optical interconnect matrix 2. Network input is represented by the time-dependent stimulus vector $\overline{\sigma}^o(t)$ and network output by the time-dependent neural state vector $\overline{\sigma}(z=L;t)$, where L is the length of the neuron array. Physically, $\overline{\sigma}^o(t)$ and $\overline{\sigma}(L;t)$ are lexicographically ordered pattern vectors whose elements represent electric field distributions incident on or emergent from individual neurons of the array. Optical beamsplitters 3 and 4 provide the means by which information is, respectively, injected into and extracted from the network. Lenses 5 and 6 image optical neuron array 1 onto optical interconnect matrix 2 and optical interconnect matrix 2 onto optical neuron array 1, respectively.

Figure 2:
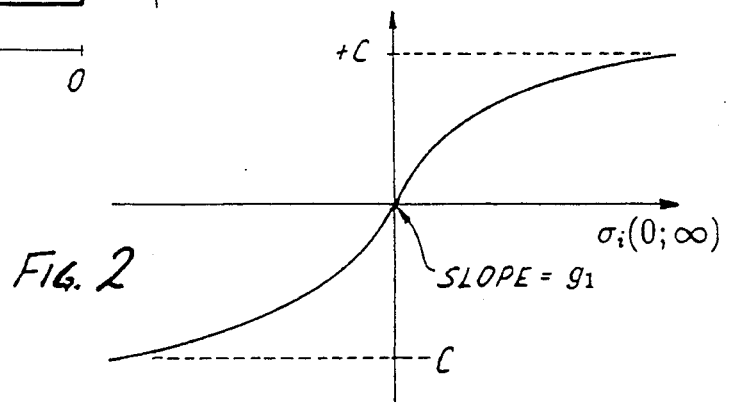
FIG. 2 is a plot of an equilibrated ($t = \infty$) neural transfer function.

The network functions by continuously updating and nonlinearly processing $\overline{\sigma}(L;t)$ State vector updating (the calculation of new neural inputs) is accomplished by computing:

$$\overline{\sigma}(z=0;t) = R\overline{\sigma}(L;t) + \overline{\sigma}^0(t). \quad (1)$$

where $\overline{\sigma}(0;t)$ is the neural input vector and R represents optical interconnect matrix 2. Nonlinear processing (the calculation of new neural outputs) is accomplished by passing $\overline{\sigma}(0;t)$ through optical neuron array 1:

$$\overline{\sigma}(L;t+\tau) = \overline{g}[\overline{\sigma}(0;t)], \quad (2)$$

where $\overline{g}[\cdot]$ is a vector sigmoidal transfer function which operates on each element of $\overline{\sigma}(0;t)$ and $\tau$ is the optical neuron time constant. Typically, $g_i$ (the $i^{th}$ element of $\overline{g}$) asymptotically approaches $+C$ (a constant) for large $\overline{\sigma}_i(0;t)$ (the $i^{th}$ element of $\sigma$) and $-C$ for small $\sigma_i(0;t)$. A representative plot of $g_i$ vs $\sigma_i(0;t)$ for an equilibrated network (i.e., $t=\infty$) is shown in FIG. 2. The network is deemed to have reached an attractor (or to have made a "decision") once $\overline{\sigma}(L;t+\tau) \simeq \overline{\sigma}(L;t)$. Attractors may represent features, pattern prototypes, associations, or solutions to constrained optimization problems.

Figure 3:
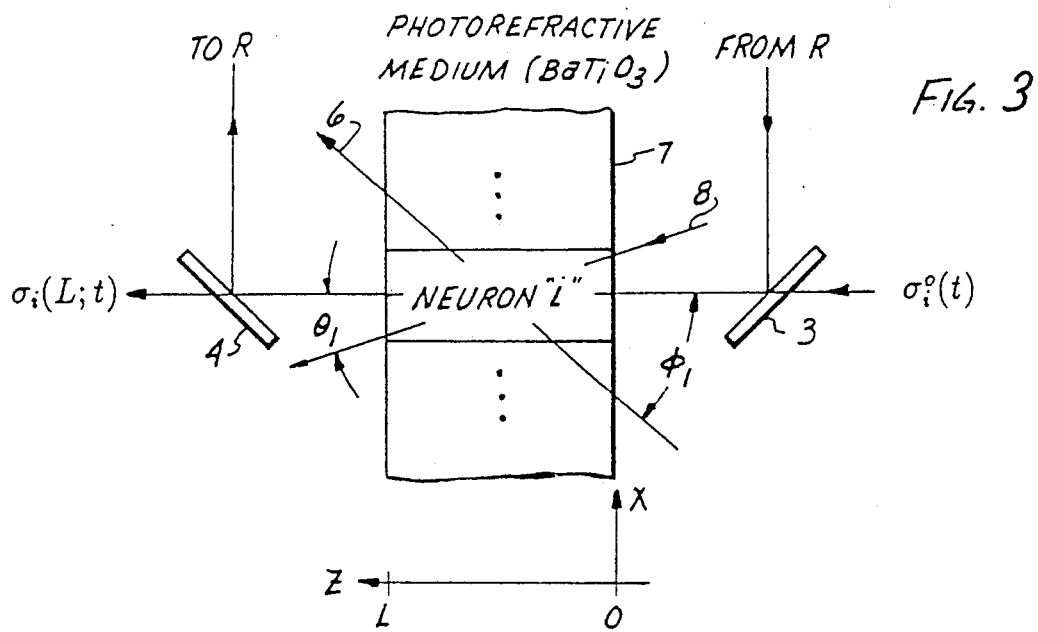
FIG. 3 is a detailed diagram of an individual "optical neuron"

A single neuron is shown in more detail in FIG. 3. The requisite sigmoidal neural transfer function is realized by exploiting the phenomenon of saturable, two-beam amplification within barium titanate ($BaTiO_3$) crystal 7 (see, for example, Y. Fainman, E. Klancnik, and S. H Lee in "Optimal coherent image amplification by two-wave coupling in photorefractive $BaTiO_3$, "Optical Engineering, vol. 25, p. 228 (1986)). For a given neuron array geometry, the magnitude of spatially and temporally uniform amplifier pump beam 8 at $z=0(\rho_1)$ determines the time $\tau$, required to update the neural state vector. The angle $\eta_1$, between pump beam 8 and the z-axis is selected in such a way that the small-signal neural gain, $g_1$, is maximized without permitting pump beam 8 to intersect more than one neural volume before it exits $BaTiO_3$ crystal 7. Adherence to this design constraint minimizes both the occurrence of neural crosstalk and the time required for the network to reach a decision. For $\tau_1 = 10$ watts/cm$^2$, $\theta_1 = 1.15°$, L=3.2 mm, $\lambda$ (the free-space optical wavelength)=488 nm, and $\phi_1$ (the angle between the z-axis and c-axis 6 of $BaTiO_3$ crystal 7)=42°, computer analyses yield a network decision time on the order of one millisecond and a small-signal neural gain of approximately 60. These parameters also imply a cross-sectional area for an individual neuron of approximately 500 $\mu m^2$ (= 10 $\mu m \times$ 50 $\mu m$).

A detailed diagram of optical interconnect matrix 2 is shown in FIGS. 4a-c. This architecture calculates $R\sigma(L;t)$ by implementing an algorithmic approach first proposed by Farhat and Psaltis in "Optical information processing based on an associative-memory model of neural nets with thresholding and feedback," Optics Letters, vol. 10, p. 98 (1985). For a network trained according to Hebb's law, (D. O. Hebb in *The Organization of Behavior*, Wiley, N.Y., 1949), $$R = \sum_k \overline{v}^k \cdot (\overline{v}^k)^T \quad (3)$$

and $$\begin{aligned} R\sigma(L;t) &= \sum_k \overline{v}^k \cdot (\overline{v}^k)^T \overline{\sigma}(L;t) \\ &= \sum_k [\overline{v}^k, \overline{\sigma}(L;t)]\overline{v}^k. \end{aligned} \quad (4)$$

where the $v$ are lexicographically ordered training set pattern vectors, $(\cdot)^T$ denotes vector transpose, and $[\cdot, \cdot]$ denotes vector inner product. The architecture shown in FIG. 4 uses a modified Vander Lugt filter (A. B. Vander Lugt in "Signal detection by complex spatial filtering," IEEE Transactions on Information Theory, vol. IT-20, p. 2(1964) to compute the inner product terms of Equation (4) and angle-multiplexed, object-space holograms 14 of the $\overline{v}^k$ to perform the summation. The modified Vander Lugt filter (phase encoder 9; spherical lenses 10 and 11; and angle-multiplexed, Fourier-space holograms 12) functions by cross-correlating a phase-encoded $\overline{\sigma}(L;t)$ with each of the (identically) phase-encoded $\overline{v}^k$ and then using spatial filtering techniques within correlation plane 13 to reject all but the dc-component of the resulting correlation integral. Summation over the $\overline{v}^k$ is then accomplished by illuminating object-space holograms 14 with the spatially filtered light emergent from correlation line 13. Proper algebraic (bipolar) summation is assured by the fact that each hologram pair (Fourier-space and object-space holograms 12 and 14, respectively) corresponding to a given $\overline{v}^k$ is generated a common (plane) reference beam 15, $A^k$, whose phase is fixed with respect to all other $A^j$ ($j \neq k$) and whose angle-of-incidence with respect to the normal of Fourier-space holograms 12 is $\Psi_k$.

The above-described calculation of $R\overline{\sigma}(L;t)$ may be understood in greater detail by considering the electric field distributions which, under appropriate excitation conditions, exist at various points within optical interconnect matrix 2. Accordingly, for an electric field distribution incident on Fourier-transform holograms 12 given by $$E^{(1)} = F\{\sigma(L;t) \cdot e^{j\beta}\}; \quad (5)$$

where $\sigma(L;t)$ is the two-dimensional electric field distribution which corresponds to $\sigma(L;t)$, $\beta$ is the two-dimensional phase encoding function characteristic of phase encoder 9 (see, for example, C. N. Kurtz in "The transmittance characteristics of surface diffusers and the design of nearly band-limited binary diffusers," Journal of the Optical Society of America, vol. 62, p. 982 (1972), and $F\{\cdot\}$ denotes Fourier transform; and for a refractive index distribution within Fourier-transform holograms 12 proportional to $$\sum_k [|A^k|^2 + |v^k|^2 + (A^k)^* v^k + A^k (v^k)^*]; \quad (6)$$

where, as noted earlier, $A^k$ is the amplitude of planar reference beam 15 associated with training set pattern $v^k$, $(\cdot)^*$ denotes complex conjugate, and $v^k$ is the two-dimensional field distribution given by $$v^k = F\{v^k \cdot e^{j\beta}\}; \quad (7)$$

the electric field distribution (correlation integral) within correlation plane 13 of FIG. 4a is given by $$E^{(2)} = \sum_k a^k * [(v^k \cdot e^{i\beta}) \star (\sigma(L;t) \cdot e^{i\beta})] \quad (8)$$

where $a^k$ is the inverse Fourier transform of $A^k$, "$*$" denotes convolution, and "$\star$" denotes correlation. Spatial filtering of $E^{(2)}$ within correlation plane 13 approximately the mid-point of linear, two-beam amplifier 16, is performed both within and perpendicular to the plane of FIG. 4a (viz., the plane of the network). In-plane spatial filtering occurs as a natural result of Bragg selectively within Fourier transform holograms 12 (see, for example, T. Jannson, H. M. Stoll, and C. Karaguleff in "The interconnectability of neuro-optic processors", Proceedings of the International Society for Optical Engineering, vol. 698, p. 157 (1986). Spatial filtering perpendicular to the plane of the network is achieved by using cylinder lens 17 in conjunction with anamorphically shaped pump beam 18 (see FIG. 4b) to create ribbon-shaped interaction region 19 within linear amplifier 16 (see FIG. 4c). These spatial filtering effects yield for the field distribution at approximately the mid-point of linear amplifier 16:

$$E^{(3)} = \sum_k a^k \cdot \int\int v^k \cdot \sigma(L;t) d\bar{r}^2, \quad (9)$$

where the coherence length of phase encoder 9 has been assumed to be significantly less than (e.g., less than 10% as large as) the coherence length of either $\sigma(L;t)$ or $v^k$ and the double integral has been taken over plane 13 which approximately bisects linear amplifier 16. Inverse Fourier transformation of $E^{(3)}$ by lens 20 and passage through reimaging cylinder lens 21 then yield for the field distribution incident on object-space holograms 14:

$$E^{(4)} = \sum_k A^k \cdot \int\int v^k \cdot \sigma(L;t) d\bar{r}^2. \quad (10)$$

Finally, for a refractive index distribution within object-space holograms 14 proportional to $$\sum_k [|A^k|^2 + |v^k|^2 + (A^k)^* v^k + A^k (v^k)^*], \quad (11)$$

the field distribution emergent from object-space holograms 14 is given by $$E^{(5)} = \sum_k v^k \cdot \int\int v^k \cdot \sigma(L;t) d\bar{r}^2 \quad (12)$$

or, following lexicographic ordering:

$$E^{(5)} = \sum_k [\bar{v}^k \cdot (\bar{v}^k)^T] \bar{\sigma}(L;t) = R\bar{\sigma}(L;t), \quad (13)$$

where it has been assumed that $|A^k|^2 = 1$. Field $E^{(5)}$ represents the product of R and $\bar{\sigma}(L;t)$ and is the desired result.

The geometry of linear, two-beam, BaTiO3 amplifier 16 is shown in greater detail in FIGS. 4b and 4c. For $\rho_2$ (the power density of linear amplifier pump beam 18 at the mid-point of linear amplifier 16) = 125 watts/cm$^2$, $\theta_2$ (the angle between pump beam 18 and the plane of the neural network) = 45°, l (the length of BaTiO3 linear amplifier 16 parallel to the latter's crystal c-axis) = 6 mm, λ (the free-space optical wavelength) = 488 nm, $\phi_2$ (the angle between the plane of the neural network and the crystal c-axis of BaTiO3 linear amplifier 16) = 25°, a typical linear amplifier gain is approximately 32 dB (gains vary as a function of the specific BaTiO3 crystal used and it is evident that the pump beams for the linear and saturable amplifiers intersect their respective BaTiO3 crystals at different angles). In FIG. 4c, typical cross-sectional dimensions of ribbon-shaped amplification region 19 within Section D—D, which approximately bisects linear amplifier 16, are 8 mm × 15 μm.

Figure 8A:
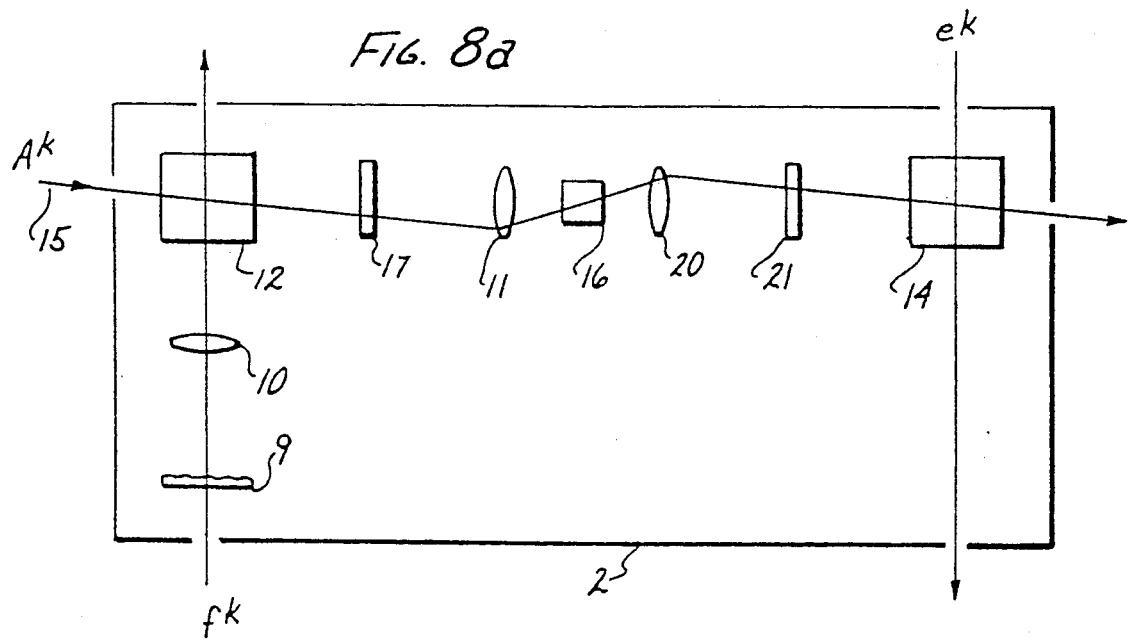
FIG. 8a illustrates the use of a common reference beam, $A^k$.
Figure 8B:
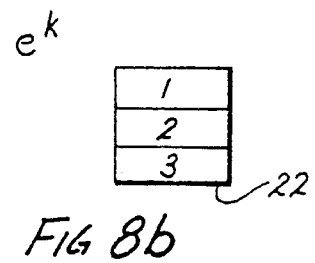
FIGS. 8b and 8c illustrate two-dimensional patterns, $e^k$ and $f^k$, used to generate the matrix. Regions 1, 2, and 3 of patterns $e^k$ and $f^k$ are exposed sequentially. When regions 1 contains information, regions 2 and 3 are blanked (no information) and similarly for regions 2 and 3. Reference beam $A^k$ remains constant during the sequential exposure process.
Figure 8C:
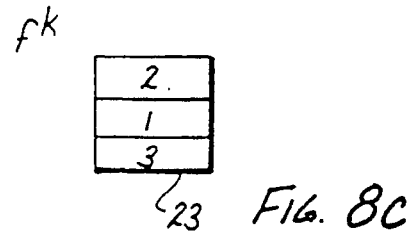

The form of the network interconnect matrix, R, may be arbitrary (i.e., either symmetric, asymmetric, real, complex, or any combination thereof) and depends on the manner in which object-space holograms 14 and Fourier-space holograms 12 are generated during network training. FIG. 5 illustrates the generation of a symmetric interconnect matrix in which a given input light pattern $a^k$ and its phase-encoded Fourier transform are simultaneously used to generate object-space and Fourier-space holograms. FIG. 6 illustrates the generation of an asymmetric interconnect matrix in which two different light patterns, $a^k$ and $b^k$, are simultaneously used to generate object-space and Fourier-space holograms. FIG. 7 illustrates the generation of a complex, asymmetric matrix in which two different light patterns, $c^k$ and $d^k$, are simultaneously used to generate object-spaced and Fourier-space holograms which are out-of-phase with respect to previously generated holograms. Phase adjustment is achieved by introducing an appropriate phase offset δ (relative to the phase of other training set reference beams) in reference beam 15 used to generate the holograms. Finally, FIG. 8 illustrates the generation of an interconnect matrix which contains sub-matrices whose elements all equal zero. This type of matrix may be generated (using common reference beam 15) by sequentially exposing object-space holograms 14 and Fourier-space holograms 12 to pattern pairs, 22 and 23, which contain information in only sub-regions of the available two-dimensional pattern space. The latter type of matrix may be used to realize multi-level optical neural networks (see, for example, K. Wagner and D. Psaltis in "Multilayer optical learning networks," Applied Optics, vol. 26, p. 5601 (1987)) or bi-directional optical networks (see, for example, C. C. Guest and R. TeKolste in "Designs and devices for optical bidirectional associative memories," Applied Optics, vol. 26, p. 5055 (1987)).

Interconnect matrices generated within the preferred material (iron-doped LiNbO3) may be "permanently" fixed by heating the LiNbO3 to approximately 160° C. for approximately twenty-five seconds (see, for example, D. L. Staebler, W. J. Burke, W. Phillips, and J. J. Amodei in "Multiple storage and exposure of fixed holograms in Fe-doped LiNbO3," Applied Physics Letters, vol. 26, p. 182 (1975)). Holograms fixed in such a manner are estimated to have a half-life of approximately 500,000 years at room temperature.

Once the interconnect matrix has been structured, the network may be presented with arbitrary input patterns and the network output observed. Input is introduced into the network by imaging two-dimensional patterns of coherent, monochromatic light onto a plane with is perpendicular to the direction of light propagation and which approximately bisects the optical neuron array. Input patterns may be generated in real time by illuminating either a two-dimensional spatial light modulator or a two-dimensional image transparency with a collimated laser beam. Network output, which consists of spatially phased-modulated, constant-intensity ($=C^2$, where, referring to FIG. 3, C is the saturation value of the neural transfer function) light patterns, may be extracted from the network by imaging the plane which bisects the optical neuron array onto an external Schlieren filter (see, for example, M. Born and E. Wolf in *Principles of Optics*, Pergamon Press (1965)). The latter converts two-dimensional, phase-modulated, constant-intensity light distributions into two-dimensional, intensity-modulated light distributions which can be observed and interpreted using square-law light detection means.

Figure 9:
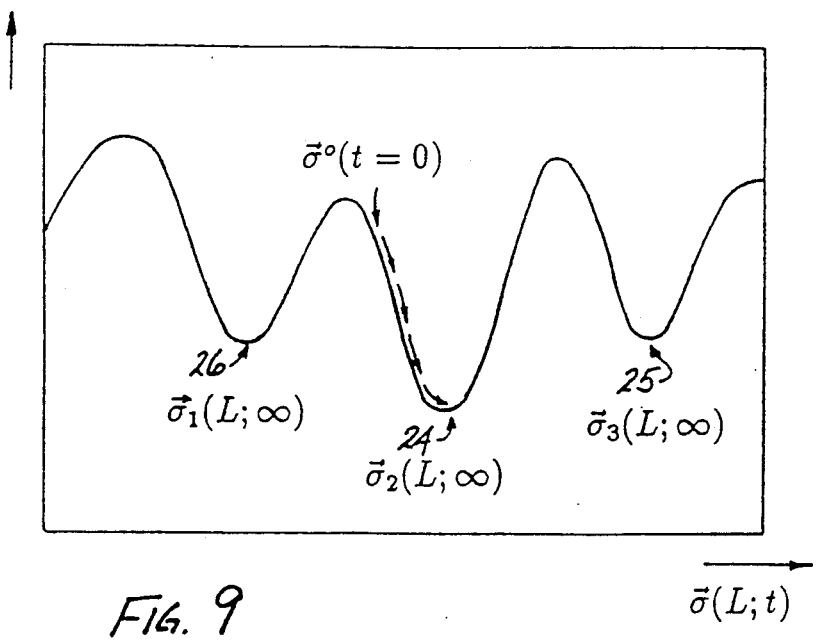
FIG. 9 is a diagram of the network "energy" function.

As noted earlier, network input may represent partial, noisy, or distorted patterns of information and network output may represent important pattern features, pattern prototypes, associations, or solutions to constrained optimization problems. Networks which perform these functions typically incorporate symmetric interconnect matrices (see, for example, J. A. Anderson, J. W. Silverstein, S. A. Ritz, and R. S. Jones in "Distinctive features, categorical perception, and probability learning: some applications of a neural model," Psychological Review, vol. 84, p. 413 (1977)) and J. J. Hopfield in "Neural networks and physical systems with emergent collective computational abilities," Proceedings of the National Academy of Sciences, USA, vol. 79, p. 2554 (1982)). An "energy" diagram, which schematically illustrates the operation of a symmetrically interconnected network, is shown in FIG. 9. The "energy" of the network (or the network's summarizing or Liapunov function) is typically expressed as a quadratic function of the elements of $\overline{\sigma}(L;t)$, with functional parameters related to the interconnect matrix, R, and the neural transfer function $\overline{g}$. Energy minima correspond to network equilibrium states ($\overline{\sigma}_1(L; \infty), \overline{\sigma}_2(L; \infty)$, or $\overline{\sigma}_3(L; \infty)$) and may, for example, represent image features, pattern prototypes, associations, or good-to-best solutions to constrained optimization problems. In the latter case, global minimum network attractor 24 (the deepest energy minimum) corresponds to the best solution to a constrained optimization problem and local minima 25 and 26 correspond to good problem solutions. Several algorithmic techniques exist to find global minimum 24. All are, however, computationally intensive and time consuming due to the tendency of the system under investigation to become trapped in intermediate, local energy minima 25 and 26. A novel feature of the present invention is its ability, given a complex stimulus vector, $\sigma(t=0)$, to converge automatically and quickly to the global energy minimum. Complexity (i.e., having real and imaginary parts) is imparted to the stimulus vector by tilting its phase front. The larger the tilt, the faster the network converges to the global minimum attractor.

Networks may also incorporate asymmetric interconnect matrices whose training set pattern pairs represent spatially or temporally related patterns of information (see, for example, T. Kohonen and E. Oja in *Parallel Models of Associative Memory*, Chapter 4, Lawrence Erlbaum Associates, New Jersey (1981)). The output of an asymmetrically interconnected network typically consists of a time-periodic, cyclical display of features which span the training set pattern pairs used to structure the network's interconnect matrix.

For purposes of illustration, the network has been described as incorporating barium titanate ($BaTiO_3$) crystals as both linear and saturable amplification means. Other materials, such as strontium barium niobate ($SrBaNbO_3$ or $SrBaNbO_3:Ce$), potassium niobate ($KNbO_3$), bismuth silicon oxide ($Bi_{12}SiO_{20}$), or gallium arsenide (GaAs or GAAs:Cr) may also be utilized as such means. In a like manner, iron-doped lithium niobate ($LiNbO_3$: Fe) is presently the preferred volume holographic storage media. Other materials, such a bismuth germanium oxide ($Bi_{12}GeO_{20}$), bismuth silicon oxide ($Bi_{12}SiO_{20}$), strontium barium niobate ($SrBaNbO_3$ or $SrBaNbO_3$: Ce), thermoplastics, or dichromated gelatins, may also be used as the storage media.

This invention has been described in conjunction with the illustrative embodiments enumerated above. It will be evident to those skilled in the art that various alterations, modifications, and variations may be made to the illustrative embodiments without departing from the spirit and scope of the claims appended hereto. For these reasons, this invention is not to be construed as being limited to only the illustrative embodiments, but should only be construed in view of the appended claims.

What is claimed is:

1. A process for finding minima of a system energy function which comprises:
   locating a saturable optical amplifier, first and second volume holograms, and a linear optical amplifier in a ring resonator,
   inputting a training set into said resonator in conjunction with illumination of said first and second volume holograms with coherent reference beams,
   illuminating said saturable amplifier and said linear amplifier with mutually coherent pump beams, and
   inputting a stimulus pattern into said resonator.

2. The process of claim 1 including:
   locating a phase encoder in said resonator in operative association with said volume holograms.

3. The process of claim 1 including:
   shaping the pump beam of said linear amplifier as a ribbon.

4. The process of claim 1 including:
   inputting said stimulus pattern into said resonator with a tilt incorporated into the phase front of said stimulus pattern.

5. A process for finding minima of a system energy function which comprises:
   providing a resonator means having a saturable gain means,
   inputting a spatially patterned signal into a resonator means to define a plurality of optical neurons therein,
   locating a means for interconnecting said optical neurons in said resonator means,
   located a linear gain means in said resonator means,
   operating said means for interconnecting optical neurons to interconnect said plurality of optical neurons, and
   operating said linear gain means to introduce gain into said resonator means.

6. A process for finding the global minima of a system energy function which comprises:
   interconnecting a plurality of neurons in a recurrent neural network, each of said neurons being characterized by having a sigmoidal transfer function, inputting a complex stimulus pattern into said network wherein said complex stimulus pattern has both a real part and an imaginary part, operating said network for a time sufficient to cause said network to converge on the global minimum attractor of said network.

7. The process of claim 6 including:

selecting said plurality of neurons as saturable optical amplifiers, selecting said stimulus pattern as an optical pattern having phase information incorporated in said pattern, tilting the phase front of said optical pattern to introduce imaginary parts into said pattern.

8. An optical neural network method for finding minima of a system energy function comprising:

forming an array of saturable optical amplifiers into an optical neuron array having inputs and outputs, forming an adaptive and bipolar global optical interconnect for multiplying the outputs of said optical neuron array by an interconnect matrix and for optically interconnecting the result to the inputs of said array to form a recurrent, resonant network, structuring the interconnect matrix to define said system energy function, and supplying gain to achieve convergent, resonant operation of said network so that operation of said optical neural network finds system energy function minima.

* * * * *